July 27, 1965  L. HÄKKÄ  3,196,921
ANTI-SKID MEANS FOR VEHICLE TIRE AND THE LIKE
Filed Nov. 25, 1963
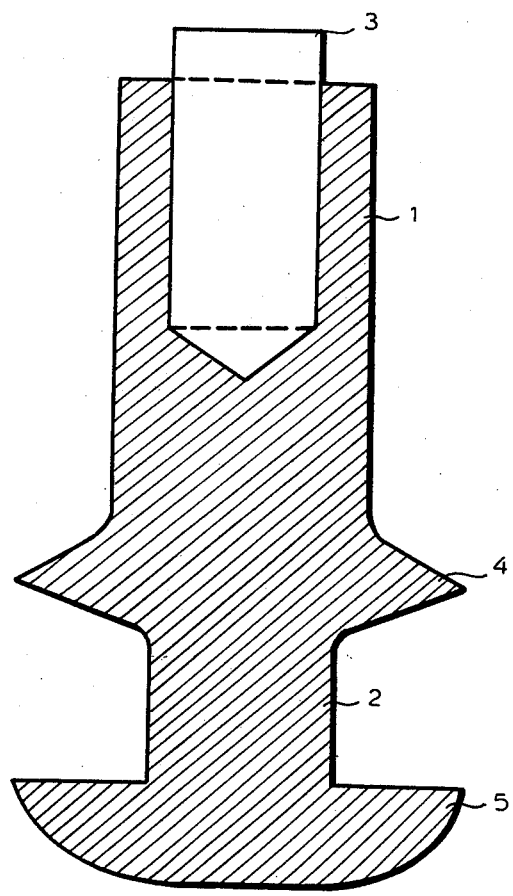
Inventor
Lennart Häkkä
by Michael J. Striker

United States Patent Office 3,196,921
Patented July 27, 1965

3,196,921
ANTI-SKID MEANS FOR VEHICLE TIRE
AND THE LIKE
Lennart Häkkä, Lauttasaari, Finland, assignor to
Oy Kovametalli AB, Helsinki, Finland
Filed Nov. 25, 1963, Ser. No. 325,818
Claims priority, application Finland, Feb. 20, 1963,
326/63
9 Claims. (Cl. 152—210)

This invention relates to an anti-skid means of the kind set forth below and adapted to be disposed in a vehicle tire and the like. When an anti-skid means includes two or more enlargements there is attained the advantage that the anti-skid means will not tilt in the tire at least to any noteworthy degree when the vehicle is being driven. In the said kind of anti-skid means the enlargements have been placed so that the first enlargement is arranged near the middle of the means or thence toward the roadward turned tip of the means and the second enlargement is located on the opposite side of the middle of the means, hence at a point interbetween the middle of the means and the means tip innermost in the tire material. From this it follows that the enlargements are spaced fairly far apart and that at least one enlargement is located relatively close to the tire tread surface. This has been found to cause the notable disadvantage, particularly when the tire configuration is very resilient, that the enlargements are hard on the tire and easily cause rents and ruptures, in other words ruin the tire.

This invention has for its object to obviate the aforementioned disadvantage. Thus the following advantages are attained: The enlargements included in the anti-skid means are spaced so close together and so far from the tire thread surface that the same will not be hard on the tire and not ruin the tire even when the tire configuration or pattern is very resilient.

The invention will be described more in detail with reference to the accompanying drawing showing an embodiment of the invention. In the drawing is shown a longitudinal sectional view of the anti-skid means of the invention.

This anti-skid means has a peg-like body. It includes a thicker peg-like fore-part 1 and a narrower rear-part 2. The length of the fore-part 1 is at least half of the length of the whole anti-skid means, preferably a bit more. Within the fore-part 1 is disposed a hard-metal tip-piece 3 which slightly protrudes from the end of the body. A flange 4 encircles the juncture of the fore-part 1 and the rear-part 2. This flange decreases evenly on moving from the body towards the flange edge and the top face of the flange extends obliquely downwards and the under side of the flange extends obliquely upwards. A base enlargement 5 is located at the end of the rear-part 2 of the anti-skid means. In the embodiment shown this base enlargement is in the shape of a spherical segment but it is to be understood that the same can be hemispherical or flange-like.

When the flange 4 is located below the body middle the said will be spaced closer to the base enlargement than when the flange 4 is located in that part of the anti-skid means which lies between the middle and the roadward turned end of the said means and for the stated reason the flange 4 will also be embedded fairly deep in the tire material. From the aforementioned facts it follows that the enlargements of the anti-skid means will not, to any noteworthy degree at least, prevent the tire configurations or patterns from yielding and thus they are not hard on the tire and do not ruin the tire even if the tire configuration or pattern are very resilient or provided with suction cups.

It is to be understood that the invention is not limited to the above described embodiment, for the same may be modified in many different ways within the scope and spirit of the invention. So. e.g., the enlargements may be shaped otherwise than hereinabove described, for the main thing is that the enlargements are located in that half of the anti-skid means that is to be embedded innermost in the tire material. The second enlargement need not necessarily be located at the very end of the anti-skid means to be embedded innermost in the tire material but may be spaced a distance from that end. The invention also contemplates the provision of more than two enlargements. The anti-skid means of the invention is adapted to be embedded in the tire as such or in a hole made beforehand in the tire but the said means may also be embedded in the tire in a manufacturing step thereof.

I claim:

1. Anti-skid means adapted to be inserted into the thread surface of a ready made tire, preferably into a tight bore-hole made in said tread surface, and comprising an elongated, substantially plug-like body member having a middle, an inner end and an outer end and provided at the outer end with a wear-resistant tip piece disposed within a hole made in the outer end of said body member, the said tip piece projecting from said body member and extending outwardly from the thread surface of said tire, said body member having at least two annular flange-like projections extending transversely of the direction of elongation of the body member separate from each other and integral with said body member, said projections being respectively located longitudinally of said body at points appreciably inwards of the body middle, and said projections having respective cross sections tapering in thickness toward the outer edges of the projections.

2. Anti-skid means as defined in claim 1, wherein one of said two projections is located at the inner end of said body member, and the other of said two projections is located spaced from said one projection toward, but short of said middle of the body member.

3. Anti-skid means as defined in claim 1, wherein said body member consists of a first substantially cylindrical portion and a second substantially cylindrical portion longitudinally aligned with said first portion and having a diameter smaller than the diameter of the first portion, and wherein the projection closest to the outer end of said body is located at the joint of the first and second portions.

4. Anti-skid means as in claim 3, characterized in that the outermost projection is integral with the thicker portion of said body member.

5. Anti-skid means adapted to be inserted into a vehicle tire and comprising, in combination, an elongated body member adapted to be inserted into a tire and having an outer end, and an inner end formed with an integral head extending transversely of the axis of said body member, said body member having a first cylindrical portion extending from said outer end toward but short of said inner end, a second cylindrical portion coaxial with and integrally joined to said first cylindrical portion and having a diameter smaller than said first portion, said first portion being formed with an axial bore extending from said outer end at least partly therethrough, and an annular flange radially extending from said first cylindrical portion at the location where the latter is joined with said second portion, said flange having an outer edge and tapering in the direction thereof away from said body member; and a wear-resistant insert received in said bore and slightly exceeding the length thereof so that an end portion of said insert slightly projects beyond said outer end of said body member to engage a road surface.

6. Anti-skid means as defined in claim 5 in which said first portion of said body member is at least equal in length to said second portion thereof.

7. Anti-skid means as defined in claim 5 wherein said head is hemispherical and provided with an annular face facing said outer end.

8. Anti-skid means as defined in claim 5 in which the length of said first portion of said body member exceeds the length of said second portion whereby said flange is closer to said inner end than to said outer end.

9. Anti-skid means adapted to be inserted into a vehicle tire and comprising, in combination, an elongated member adapted to be inserted into a tire and having an outer end, and an inner end, said body member having a first cylindrical portion extending from said outer end toward but short of said inner end, a second cylindrical portion coaxial with and integrally joined to said first cylindrical portion and having a diameter smaller than said first portion, said first portion being formed with an axial bore extending from said outer end at least partly therethrough, and a first retaining member radially extending from said first cylindrical portion at the location where the latter is joined with said second portion, said first retaining member having an outer edge and tapering in the direction thereof away from said body member; a second retaining member integrally surrounding said body member at a location intermediate said first retaining member and said inner end; and a wear-resistant insert received in said bore and slightly exceeding the length thereof so that an end portion of said insert slightly projects beyond said outer end of said body member, said body member being adapted to be embedded in said tire and said end portion of said insert being adapted to project beyond said tread surface of said tire to engage a road surface.

References Cited by the Examiner

UNITED STATES PATENTS

| | | | |
|---|---|---|---|
| 896,145 | 8/08 | Payne | 152—210 |
| 2,652,876 | 9/53 | Eisner | 152—210 |
| 3,124,191 | 3/64 | Forslund | 152—210 |
| 3,125,147 | 3/64 | Hakka | 152—210 |

FOREIGN PATENTS 4,115    3/05    France.

ARTHUR L. LA POINT, *Primary Examiner.*